July 22, 1952     E. S. HILFIKER     2,604,335
TRUCK BODY STEP
Filed April 22, 1950
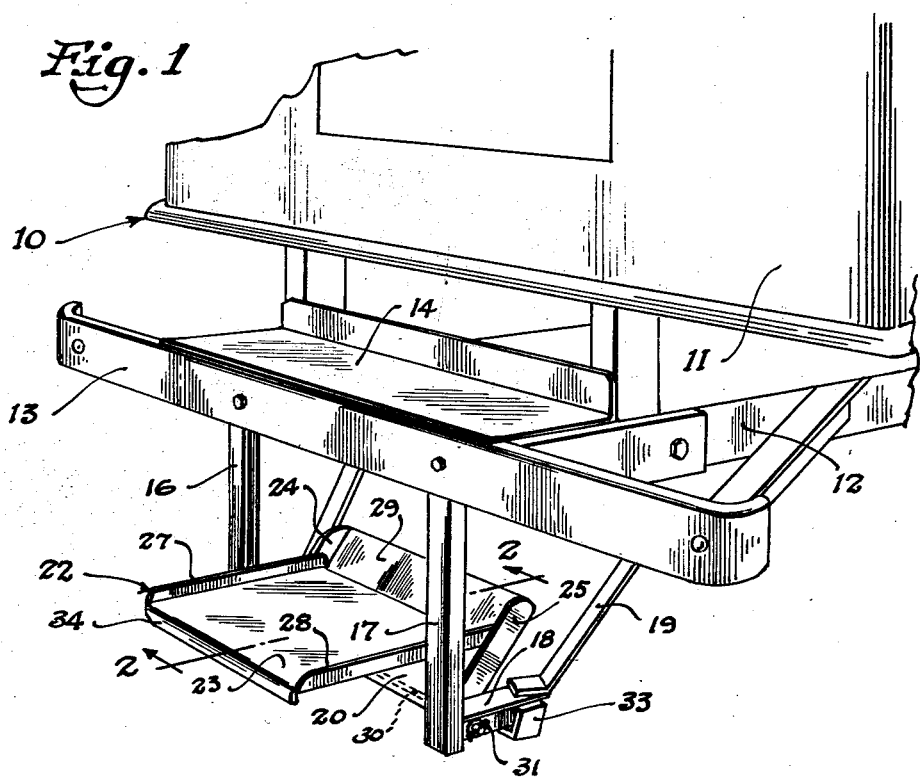
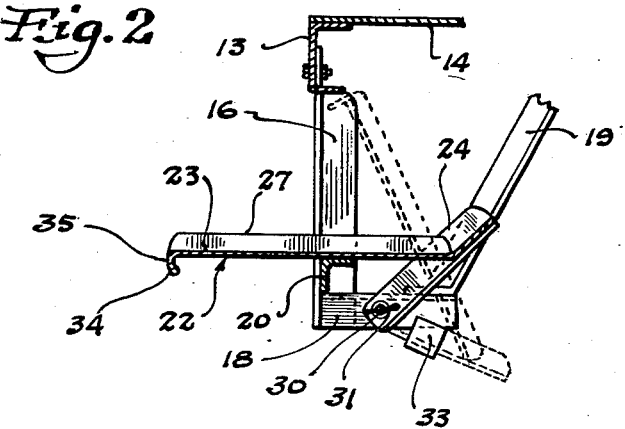
INVENTOR.
*Everett S. Hilfiker*
BY
*R. G. Story*
ATTORNEY Patented July 22, 1952

2,604,335

UNITED STATES PATENT OFFICE 2,604,335

TRUCK BODY STEP

Everett S. Hilfiker, Chicago, Ill., assignor to Swift & Company, Chicago, Ill., a corporation of Illinois Application April 22, 1950, Serial No. 157,604

5 Claims. (Cl. 280—167)

1

The present invention relates to a vehicle step for trucks or the like where it is necessary to climb in and out of a raised truck body.

In many types of delivery vehicles, particularly those in which a box-type body is mounted on a stock chassis, the only access to the body is at the rear end of the vehicle. It is extremely desirable that a suitable step arrangement be provided at that point to facilitate the work of the deliveryman or other user of the vehicle, to reduce the energy expended in getting in and out of the truck body, and to lessen the possibilities of accidents. However, anything that projects beyond the bumper structure at the end of the truck is constantly subject to being damaged, particularly in a commercial vehicle, which is often backed up to a loading dock. Furthermore, a projection increases the danger to other vehicles, should they happen to strike the rear of the truck.

In the past, efforts have been made to place steps for the convenience of the deliveryman inwardly from the bumper structure. This has been unsatisfactory for it is necessary to turn around and get down backwardly from the truck if the steps are to be used. Rather than go to this trouble, the deliveryman or other truck user will jump down, in many cases, resulting in personal injuries.

Efforts have been made to use folding step structures, but if they are counterweighted, they are out of the way at exactly the time that they are needed for use, that is, when the user is in the body of the truck, ready to climb down. If they are not counterweighted or if they latch in the useable position, they are often left in that position because of oversight, and are subsequently damaged when the truck backs up to a loading dock or is struck by another vehicle.

The present invention has for its principal object the overcoming of these problems. The present invention provides a projecting step for convenience in entering or descending from the truck body. The step device is such that should the end of the truck come into contact with another object, such as occurs when the truck backs into a loading dock, the step will disappear behind the bumper structure.

A particular feature of the present invention is that this is achieved by a simple structure, with no complicated parts or movements to cause trouble and expense. Yet, it is not done at the expense of convenience or ease of operation.

Additional objects and advantages include a device that is simple, readily fabricated by basic metal-working operations, and low in first cost; a device which not only provides an extending step, but also serves as an additional bumper structure; and a device which is positive in its retraction operation.

Further objects and advantages will become apparent from the following description taken in conjunction with the drawings, in which:

Fig. 1 is a perspective view of the rear portion of a truck, showing an embodiment of the present invention with the step in the extended position, and Fig. 2 is a transverse section taken on line 2—2 of Fig. 1.

A truck, generally 10, carries a suitable body 11 (a refrigerator body in the illustrated case), mounted on the vehicle frame 12. A bumper 13 attached to the frame 12 projects beyond the rear of the vehicle. To facilitate ingress and egress from the truck body 11, a fixed step 14 is carried by the bumper 13 and frame 12.

A pair of depending members 16 and 17 are attached to the bumper and extend substantially vertically with respect thereto. The lower ends of members 16 and 17 are secured to the truck frame 12 by means of horizontal and angular braces 18 and 19, respectively. A crosspiece 20 between members 16 and 17 spaces the lower portions thereof and also serves as a stop for the step as is subsequently described.

The pivoted step, generally 22, includes a suitable tread member, which, in the illustrated embodiment, is a flat plate 23, and a suitable frame therefor projecting outwardly at an angle with respect to the plate 23. In the illustrated embodiment, the frame includes a pair of side members 24 and 25 and upwardly-bent portions 27, 28, and 29 of the plate 23. Sides 27 and 29 form stiffeners for the length of the plate while back portion 28 stiffens the width of the plate.

The lower ends of side members 24 and 25 are pivotally connected to horizontal braces 18 by means of a rod 30. A cotter pin 31 through either end of rod 30 holds the rod against displacement.

The step may be rotated about rod 30 from an extended position, as illustrated in Fig. 1, where it is in the horizontal position suitable for use, to a retracted position, as illustrated in dotted lines in Fig. 2, where it is behind the outer face of members 16 and 17.

When step 22 is in the extended position, it rests upon crosspiece 29, which provides a support for the step (see Fig. 2). To support the step in the retracted position, an angle iron stop 33 is welded to horizontal brace 18 in such a position that one leg of the stop projects into the path of movement of side member 24 of the frame of the step. A similar stop may be attached to both horizontal braces 18, as shown in the illustrated embodiment, although, in many instances, a single such stop will be sufficient.

The outward end of plate 23 forming the step tread is turned down, as illustrated at 34, to serve as a support for the width of the forward edge of the plate. At the same time, it is turned slightly back of a position normal to the plane of plate 23 to prevent any binding between the lip 34 and an object contacted by the step 22. If such binding occurred, it might well prevent the proper retraction of the step and injure the structure thereof. An angle of 15° between the position of lip 34 and a position normal to the plane of plate 23 will be found to be satisfactory. To further reduce any tendency for such binding to occur, the nose 35 of plate 23 (the line of juncture between plate 23 and lip 34) is smoothly rounded.

The foregoing description of a specific embodiment is for the purpose of complying with section 4888 of the Revised Statutes and should not be construed as imposing any unnecessary limitations on the appended claims.

I claim:

1. A vehicle step, said step including a flat plate to serve as a tread, a frame attached to said plate, said frame having projecting portions with the projecting end of said portions being pivotally connected to said vehicle, with the pivotal axis being a substantial distance below the plate when the latter is in the horizontal position, whereby a horizontal force applied to said step when said plate is in the horizontal position will tend to rotate said plate about said axis into a retracted position.

2. A step device for the end of a vehicle, said device including a pair of spaced supporting members secured to the chassis of the vehicle, a flat plate positioned between said members to serve as a tread, a frame attached to said plate and projecting generally downwardly therefrom when the plate is in a horizontal position, with the downwardly projecting portion being pivotally connected to said members whereby a horizontal force applied to said plate, when said plate is in the horizontal position, will tend to rotate said plate about said axis, and stop means to limit the rotation of the plate between the position where said plate is in said horizontal position and a retracted position where said plate is behind said members.

3. A step device for the end of a vehicle, said device including a pair of spaced supporting members secured to the chassis of the vehicle, with a portion thereof adjacent one end of the vehicle, a flat plate positioned between said members to serve as a tread, with a portion of the plate projecting behind said members when the plate is in a horizontal position to serve as a tread, a frame attached to said plate and projecting downwardly therefrom when the plate is in the horizontal position, said frame being pivotally connected to said members, with the pivotal axis being below said plate when the latter is in said horizontal position and inwardly from said portion of said members, a crosspiece between said members below said plate when the latter is in the horizontal position to serve as a support and stop for said plate, and stop means to limit the rotation of the plate in the reverse direction at a point when the plate is retracted behind said portion of said members.

4. A step device for the end of a vehicle, said device including a pair of spaced vertical members secured at the upper ends to the chassis of the vehicle, with a portion thereof adjacent one end of the vehicle to serve as a bumper, a pair of angle braces connecting the lower ends of said members to said chassis, a flat plate positioned between said members to serve as a tread, with a portion of the plate projecting behind said members when the plate is in the horizontal position to serve as a tread, a frame attached to said plate and projecting downwardly therefrom, when said plate is in the horizontal position, said frame being pivotally connected to said members, with the pivotal axis being below said plate when the latter is in said horizontal position and inwardly from said portion of said members, said plate having the projecting nose thereof rounded off, and stop means to limit the rotation of the plate between the position where said plate is in said horizontal position and a retracting position where said plate is behind said position of said members.

5. A vehicle step, said step including a pair of spaced supporting members secured to the chassis of the vehicle, a flat plate to serve as a tread, a frame attached to said plate, said frame having projecting portions with the projecting end of said portions being pivotally connected to said members, with the pivotal axis being a substantial distance below the plate when the latter is in the horizontal position, whereby a horizontal force applied to said step when said plate is in the horizontal position will tend to rotate said plate about said axis into a retracted position.

EVERETT S. HILFIKER.

REFERENCES CITED

The following references are of record in the file of this patent:

UNITED STATES PATENTS

| Number | Name | Date |
|---|---|---|
| 814,687 | Gault | Mar. 13, 1906 |
| 1,822,399 | Hayne | Sept. 8, 1931 |
| 2,246,985 | Pellegrini | June 24, 1941 |
| 2,487,921 | Culver | Nov. 15, 1949 |

FOREIGN PATENTS

| Number | Country | Date |
|---|---|---|
| 170,203 | Great Britain | Oct. 20, 1921 |